United States Patent [19]

Tsuyama et al.

[11] Patent Number: 5,329,453
[45] Date of Patent: Jul. 12, 1994

[54] TRACTION CONTROL SYSTEM FOR AUTOMOTIVE VEHICLE

[75] Inventors: Toshiaki Tsuyama; Toru Onaka; Kazutoshi Nobumoto; Fumio Kageyama, all of Hiroshima, Japan

[73] Assignee: Mazda Motor Corporation, Hiroshima, Japan

[21] Appl. No.: 719,958

[22] Filed: Jun. 24, 1991

[30] Foreign Application Priority Data

Feb. 22, 1990 [JP] Japan .................... 2-164469

[51] Int. Cl.⁵ .................................... B60K 41/20
[52] U.S. Cl. ...................... 364/426.02; 364/426.03; 180/197; 303/103
[58] Field of Search ................ 364/426.02, 426.03; 180/197; 303/95, 96, 100, 103, 109

[56] References Cited

U.S. PATENT DOCUMENTS

| | | | |
|---|---|---|---|
| 4,733,760 | 3/1988 | Inagaki et al. | 180/197 |
| 4,779,696 | 10/1988 | Harada et al. | 180/197 |
| 4,883,325 | 11/1989 | Shimanuki et al. | 364/426.02 |
| 4,984,163 | 1/1991 | Kuwana et al. | 364/426.02 |
| 5,051,908 | 9/1991 | Shiraishi | 364/426.03 |
| 5,079,708 | 1/1992 | Brown | 364/426.02 |
| 5,082,333 | 1/1992 | Fukushima et al. | 364/426.02 |
| 5,085,288 | 2/1992 | Shiraishi et al. | 180/197 |
| 5,105,359 | 4/1992 | Okubo | 364/426.02 |
| 5,117,934 | 6/1992 | Tsuyama et al. | 364/426.03 |
| 5,140,524 | 8/1992 | Matsuda | 364/426.02 |

Primary Examiner—Gary Chin
Attorney, Agent, or Firm—Fish & Richardson

[57] ABSTRACT

The braking force to the driven wheels is subjected to feedback control so as to allow the actual slip value of the driven wheels to agree with a predetermined target value for controlling the brake. The control amount for the feedback control is determined by differentiation control. The feedback control amount contains a first control amount corresponding to a predetermined basic travelling state and a second control amount corresponding to a particular travelling state. In ordinary travelling state, the braking force is controlled by the first control amount, and the braking force is controlled by the second control amount when the automotive vehicle is travelling in such a particular state. When the the vehicle is travelling on a bad road, the second control amount is set so as to loosen the braking force, as compared with the first control amount. Alternatively, when the vehicle is cornering, the second control amount is set as to tighten the braking force as compared with the first control amount.

29 Claims, 7 Drawing Sheets

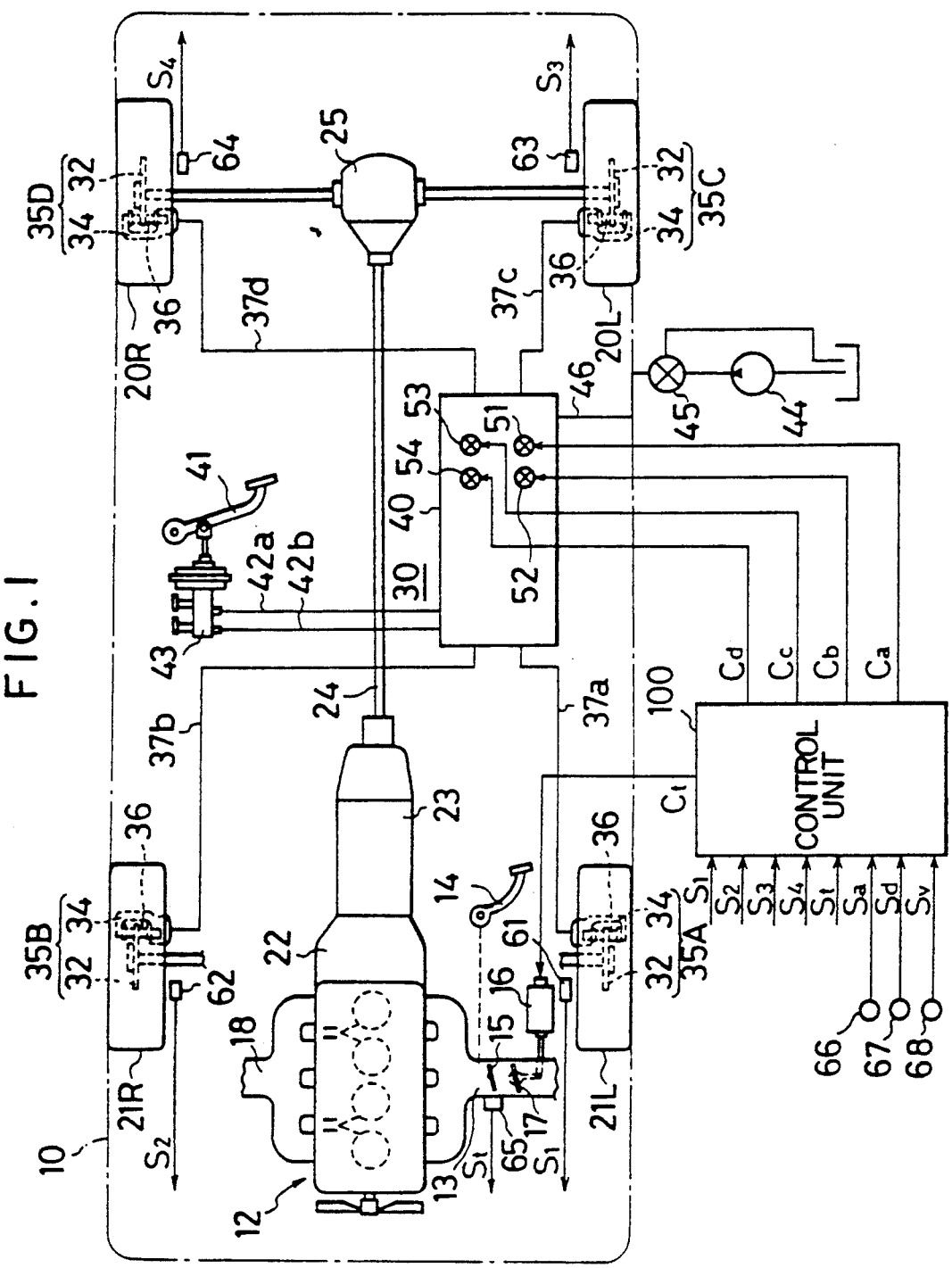
FIG. I

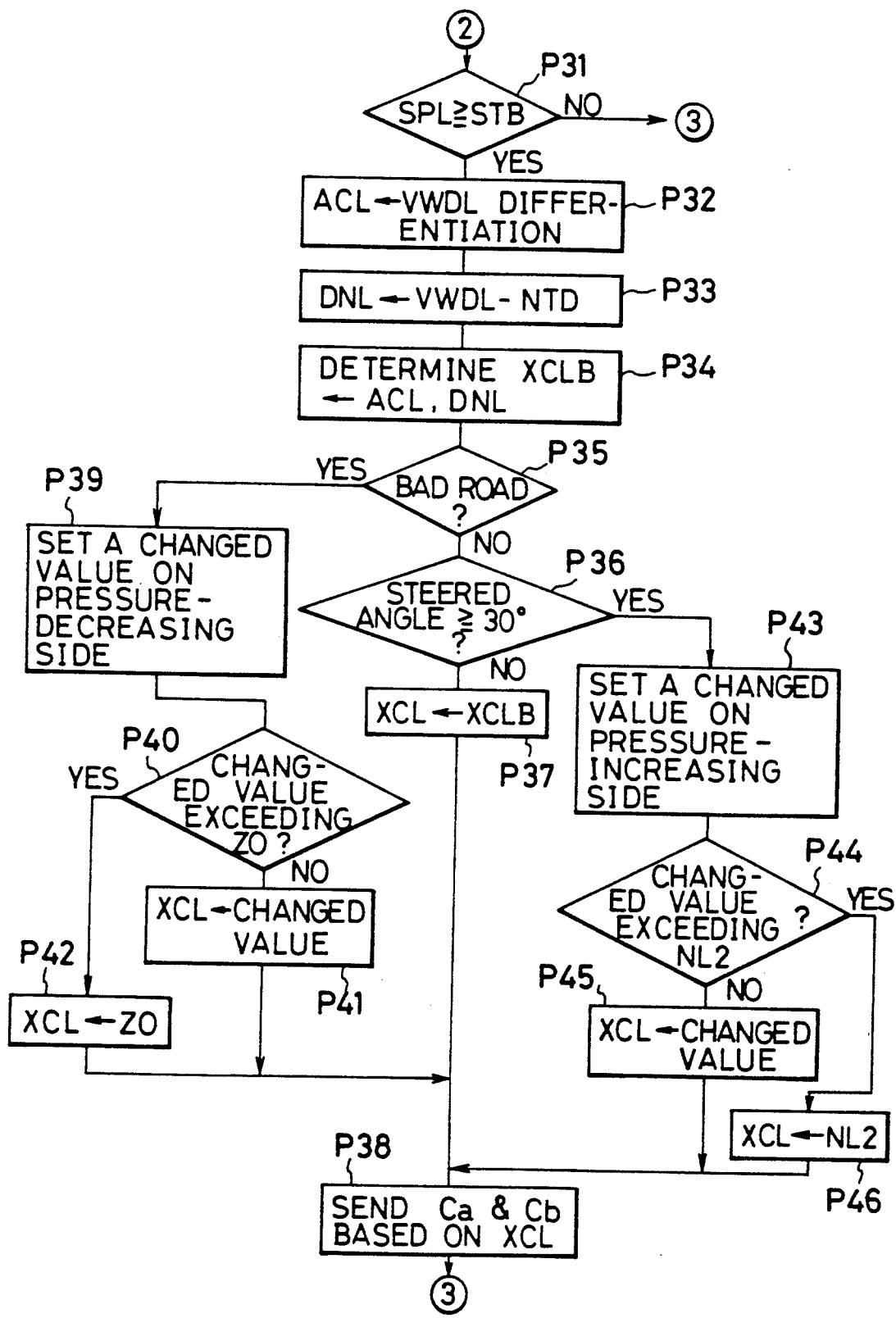

TRACTION CONTROL SYSTEM FOR AUTOMOTIVE VEHICLE

BACKGROUND OF THE INVENTION

1. Field of the Invention

The present invention relates to a traction control system for an automotive vehicle and, more particularly, to a traction control system for an automotive vehicle for an automotive vehicle so adapted as to prevent an excessive slip of a driven wheel of the automotive vehicle on a road surface.

2. Description of Related Art

In order to prevent an excessive slip of the driven wheel on a road surface, technology of controlling traction of the automotive vehicle has already been available which is so arranged as to reduce torque to be applied to the driven wheel, for example, during acceleration of the automotive vehicle, when the driven wheel or wheels slip or spin, or spins or spin, to an excessive extent.

The torque to be applied to the driven wheel or wheels is reduced by reducing braking force to be applied to the driven wheel or by reducing torque to be generated by a combustion engine.

When the traction control is performed by applying the braking force to the driven wheel, braking force adjusting means, or the braking force to the driven wheel, is subjected to feedback control so as to allow an actual slip value of the driven wheel to agree with a predetermined target braking value. In particular, recently; it is desired from the viewpoint of responsiveness, the feedback control has been desired to be performed mainly by differentiation control.

It should be noted herein that the target braking value is set on the basis of a certain basic travelling state of the automotive vehicle, e.g. on the basis of a state in which the automotive vehicle is travelling on a flat road, so that a slip value of the driven wheel to be detected when the vehicle slips may be measured as a slip value larger than the actual slip value when the automotive vehicle is travelling on a bad road, particularly on a largely rough road. As a result, the risk may be incurred that the braking force may be applied to the driven wheel to an extent larger than actually necessary, thereby worsening acceleration of the automotive vehicle. It is further noted that, as the target value is so common that it is set on the basis of the state in which the automotive vehicle is travelling straight forwards, it is desired that the slip value of the driven wheel should be maintained at a smaller value when the automotive vehicle is cornering, in order to secure stability of the automotive vehicle. From such a point of view, it is more appropriate to set the braking force to be applied to the driven wheel so as to comply with the particular travelling state of the automotive vehicle, for example, in which the automotive vehicle is travelling on a bad road surface or it is cornering, by changing the target value when the automotive vehicle has started travelling in the particular travelling state.

It is to be noted, however, that when the feedback control is performed mainly on the basis of differentiation control, the differentiation control is not reflected upon a change in the target value, so that it is extremely difficult to provide appropriate braking force so as to comply with the particular travelling state merely by the technique of changing the target value.

Japanese Patent Laid-open Publication (kokai) No. 106,762/1984 proposes that a signal detected by a sensor for sensing an actual slip value of the driven wheel is subjected to filter processing, thereby removing unnecessary noises contaminated by the sensor. In this case, however, a delay in phase may be caused, thereby making precise traction control difficult.

SUMMARY OF THE INVENTION

Therefore, the object of the present invention is to provide a traction control system for an automotive vehicle so adapted as to apply appropriate braking force to the driven wheel in correspondence with an actual travelling state of the automotive vehicle.

Another object of the present invention is to provide a traction control system for an automotive vehicle so adapted as to apply appropriate braking force to the driven wheel even during travelling on a bad road surface as well as on a flat road surface.

A further object of the present invention is to provide a traction control system for an automotive vehicle so adapted as to apply appropriate braking force to the driven wheel even during cornering as well as during travelling straight forwards.

In order to achieve the aforesaid objects, the present invention is so basically arranged as to set a second control amount so as to comply with the particular travelling state, in addition to a first control amount corresponding to a predetermined basic travelling state, as a feedback control amount, on condition that the feedback control for controlling the braking force to the driven wheel contains differentiation control.

More specifically, the present invention consists of a traction control system for an automotive vehicle, comprising:

slip detecting means for detecting a slip value of a driven wheel on a road surface;

braking force adjusting means for adjusting braking force to the driven wheel;

particular travelling state detecting means for detecting a particular travelling state in which a travelling state of the automotive vehicle is different from a basic travelling state;

first control amount determining means for determining a first control amount for the braking force adjusting means by differentiation control in accordance with the basic travelling state in order to bring the slip value detected by the slip detecting means into agreement with a predetermined target value for controlling a brake;

second control amount determining means for determining a second control amount for the braking force adjusting means by differentiation control in accordance with the particular travelling state in order to bring the slip value detected by the slip detecting means into agreement with a predetermined target value for controlling the brake; and brake control means for controlling the braking force adjusting means by the first control amount in an ordinary travelling state and by the second control amount when the particular travelling state is detected by the particular travelling state detecting means.

It is preferred that the second control amount can be obtained by correcting the first control amount, although the second control amount can be determined separately and independently from the first control amount. It is also preferred that, in correcting the first control amount, the second control amount is subjected to limit processing, thereby preventing the second control amount from becoming inappropriate.

Although the first control amount may be operated on the basis of a predetermined differentiating formula at each time when the operation is required, it is preferred from a point of view of improvements in responsiveness and for other purposes that, for example, peripheral acceleration of the driven wheel is stored in advance as a parameter, and a stored value is so selected as to comply with actual peripheral acceleration of the driven wheel to thereby determine the first control amount. In this case, when the second control amount is obtained by correction, it is preferred that the stored value is selected as the second control amount in such a manner that the braking force is decreased or increased by a predetermined stage than the stored value selected as the first control amount.

When the particular travelling state is such that the automotive vehicle is travelling on a bad road, i.e. when it is supposed that the basic travelling state is set on the basis of a flat road, on the one hand, the second control amount is set so as to loosen the braking force as compared with the first control amount. When the particular travelling state is such that the automotive vehicle is cornering, i.e. when it is supposed that the basic travelling state is that the automotive vehicle is travelling straight forwards, on the other hand, the second control amount is so set as to increase the braking force as compared with the first control amount.

Other objects, features and advantages of the present invention will become apparent during the course of the description of the preferred embodiments, which follow, with reference to the accompanying drawings.

BRIEF DESCRIPTION OF THE DRAWINGS

FIG. 1 is a schematic diagram showing an outline of the automotive vehicle to which the traction control system of the present invention is applied.

FIGS. 2A to 2D are a series of flow charts showing an example of control to be performed by the traction control system according to the present invention.

DETAILED DESCRIPTION OF THE PREFERRED EMBODIMENTS

Figure 2A:
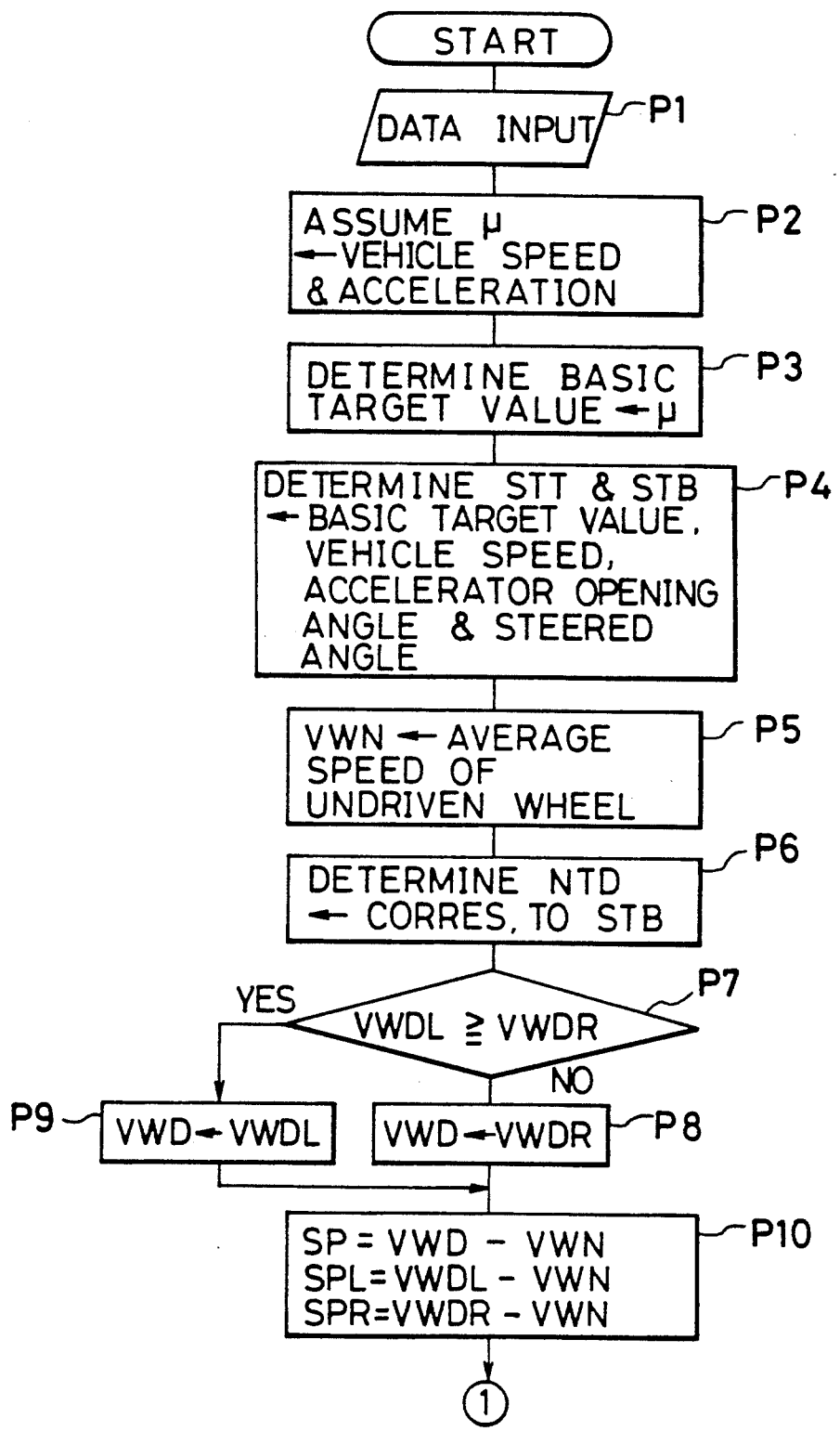

Referring to FIG. 1, a vehicle body 10 of the automotive vehicle is loaded at its front portion with a combustion engine 12 which in turn has, for example, four cylinders 11. To each of the four cylinders 11 are supplied mixed gases comprising intake air from an intake passage 13 and fuel from a fuel supply system, and the mixed gases supplied to each cylinder 11 are burned by operation of a spark system and thereafter discharged from an exhaust passage 18.

The intake passage 13 is provided with a main throttle valve 15 so associated with an accelerator pedal 14 as to change an opening degree and a secondary throttle valve 17 so arranged as to be opened or closed by a throttle actuator 16. The main throttle valve 15 and the secondary throttle valve 17 adjust the amount of intake air passing through the intake passage 13. After the amount of intake air has been adjusted by the main throttle valve 15 and the secondary throttle valve 17 mounted on the intake passage 13, the intake air is admixed with fuel from the fuel supply system and the resulting mixed gases are fed to and burned in the cylinders 11, thereby bringing the combustion engine 12 into an operating state. The output (torque) of the combustion engine 12 is transmitted to each of a left-hand rear wheel 20L and a right-hand rear wheel 20R through a power transmission passageway comprised of a fluid torque converter 22, an automatic transmission 23, a propeller shaft 24 and a differential mechanism 25. In other words, the left-hand rear wheel 20L and the right-hand rear wheel 20R are driven wheels.

The combustion engine 12, the fluid torque converter 22 and the automatic transmission 23 are so arranged as to form a one block with a left-hand front wheel 21L and a right-hand front wheel 21R disposed on the respective left-hand and right-hand sides as undriven wheels. A brake control unit 30 is formed so as to be associated with the left-hand and right-hand rear wheels 20L and 20R as well as the left-hand and right-hand front wheels 21L and 21R, and the brake control unit 30 has disk brake 35A, 35B, 35C and 35D for the left-hand and right-hand rear wheels 20L and 20R as well as the left-hand and right-hand front wheels 21L and 21R, respectively, each disk brake comprising a disk 32 and a caliper 34 having a brake pad disposed so as to press the disk 32. The caliper 34 for each of the left-hand and right-hand rear wheels 20L and 20R as well as the left-hand and right-hand front wheels 21L and 21R is provided with a wheel cylinder 36 to which in turn is connected a pipe 37a, 37b, 37c and 37d, respectively, each extending from a liquid pressure adjusting section 40. When braking liquid pressure is supplied to the wheel cylinder 36 of each of the calipers 34 from the liquid pressure adjusting section 40 through the respective pipes 37a, 37b, 37c and 37d, the caliper 34 allows its brake pad to press the disk 32 by the pressing force in accordance with the braking liquid pressure supplied, thereby braking the respective left-hand and right-hand rear wheels 20L and 20R as well as the left-hand and right-hand front wheels 21L and 21R.

To the liquid pressure adjusting section 40 is supplied liquid pressure from a power cylinder 43 mounted to a brake pedal 41 through pipes 42a and 42b in accordance with operation of depressing the brake pedal 41, in addition to operating liquid pressure created by a pump 44 and a pressure governing valve 45 to be supplied through a pipe 46. The liquid pressure adjusting section 40 creates braking liquid pressure in accordance with the operation of depressing the brake pedal 41 and supplies the braking liquid pressure to the disk brakes 35A, 35B, 35C and 35D through the respective pipes 37a, 37b, 37c and 37d. Further, the liquid pressure adjusting section 40 creates braking liquid pressure individually for each of the disk brakes 35C and 35D in accordance with the state of operation of electromagnetically opening or closing, built-in valve 51, 52, 53 or 54 and supplies the braking liquid pressure selectively to the disk brakes 35C and 35D.

The electromagnetically opening or closing, built-in valves 51, 52, 53 and 54 are classified into a pair of valves 51 and 52 and a pair of valves 53 and 54. These pairs of the electromagnetically opening or closing, built-in valves 51, 52 and 53, 54 involve adjusting the braking liquid pressure to the disk brake 35C mounted to the left-hand rear wheel 20L and to the disk brake 35D mounted to the right-hand rear wheel 20R, respectively. In each of the pairs of the valves 51, 52 and 53, 54, when the valves 51 and 53 are closed and the valves 52 and 54 are opened, on the one hand, the braking liquid pressure to be supplied to the disk brakes 35C and 35D is reduced. On the other hand, when the valves 51 and 53 are opened and the valves 52 and 54 are closed, the braking liquid pressure to be supplied to the disk brakes 35C and 35D is increased. When all the valves in each of the pairs are closed, the braking liquid pressure to be supplied to the disk brakes 35C and 35D is retained as it is.

In addition to the arrangement as described hereinabove, a control unit 100 is arranged for performing the control of operating the throttle actuator 16 and the control of opening and closing the electromagnetically opening or closing, built-in valves 51, 52, 53 and 54. The control unit 100 comprises a microcomputer consisting of a CPU, ROM, RAM, etc. To the control unit 100 are supplied output signals $S_1$, $S_2$, $S_3$ and $S_4$, indicative of a peripheral speed of each of the left-hand and right-hand rear wheels 20L and 20R as well as the left-hand and right-hand front wheels 21L and 21R, sensed by vehicle sensors 61, 62, 63 and 64 mounted to the left-hand and right-hand rear wheels 20L and 20R as well as the left-hand and right-hand front wheels 21L and 21R, respectively, an output signal St, indicative of an opening angle of the main throttle valve 15, sensed by a sensor 65 so disposed as to be associated with the main throttle valve 15, an output signal Sa, indicative of an amount in which the accelerator pedal 14 is depressed, sensed by an accelerator pedal sensor 66, an output signal Sd, indicative of a steered angle of the left-hand front wheel 21L and the right-hand front wheel 21R, sensed by a steered angle sensor 67, and an output signal Sv, indicative of a vehicle speed, sensed by a vehicle speed sensor 68.

The control unit 100 is so arranged as to receive the output signals Sa, Sd and Sv in a predetermined cycle and to compute an assumed road surface friction coefficient by collating the vehicle speed Sv and acceleration obtainable by differentiating the vehicle speed Sv with a data map, pre-stored in a built-in memory, indicating and defining the relationship among the vehicle speed, acceleration and road surface friction coefficient. By collating the assumed road surface friction coefficient with a data map, pre-stored in a built-in memory, indicating and defining the relationship between the road surface friction coefficient and a basic target slip value, there are given a first basic target slip value for the traction control by adjusting the opening angle of the secondary throttle valve and a second basic target slip value for the traction control by controlling the brakes. Further, a first target slip value STT for the traction control by adjusting the opening angle of the secondary throttle valve is given and set by multiplying the first basic target slip value with a correction coefficient on the basis of each vehicle speed indicated by the output signal Sv, the depressed amount of the accelerator pedal indicated by the output signal Sa and the steered angle indicated by the output signal Sd. Furthermore, a second target slip value STB for the traction control by controlling the brakes is given and set by multiplying the second basic target slip value with a correction coefficient on the basis of each of the vehicle speed indicated by the output signal Sv, the depressed amount of the accelerator pedal indicated by the output signal Sa and the steered angle indicated by the output signal Sd. It is then to be noted that the second target slip value STB is set to be larger than the first target slip value STT.

In addition, the control unit 100 is so arranged as to receive the output signals $S_1$, $S_2$, $S_3$ and $S_4$ in a predetermined cycle. And the state in which the driven wheel slips or spins on a road surface is detected from the difference between an average between the peripheral speeds of the left-hand front wheel 21L and the right-hand front wheel 21R and the peripheral speed of the left-hand rear wheel 20L or the peripheral speed of the right-hand rear wheel 20R, whichever is larger, and a slip value SP at that time is computed. Further, a slip of the left-hand rear wheel 20L on a road surface is detected from the difference between an average between the peripheral speeds of the left-hand front wheel 21L and the right-hand front wheel 21R and the peripheral speed of the left-hand rear wheel 20L and a slip value SPL is computed when the left-hand rear wheel 20L slips. Likewise, a slip of the right-hand rear wheel 20R on a road surface is detected from the difference between an average between the peripheral speeds of the left-hand front wheel 21L and the right-hand front wheel 21R and the peripheral speed of the right-hand rear wheel 20R and a slip value SPR is computed when the right-hand rear wheel 20R slips.

Then, the slip value SP is compared with the first target slip value STT and, when the slip value SP is equal to or larger than the first target slip value STT, on the one hand, the throttle actuator 16 is controlled to adjust the opening angle of the secondary throttle valve 17 and reduce the output of the combustion engine 12 to decrease the torque for driving the left-hand rear wheel 20L and the right-hand rear wheel 20R, thereby making the slip value SP to agree with the first target slip value STT. When the computed slip value SPL indicating the state of slip of the left-hand rear wheel 20L is found to be equal to or larger than the second target slip value STB as a comparison of the former with the latter, the traction control is performed by controlling the electromagnetically opening or closing valves 51 and 52 to thereby operate the disk brake 35C and consequently controlling the corresponding brake by reducing the torque for driving the left-hand rear wheel 20L. On the other hand, when the computed slip value SPR indicating the state of the slip of the right-hand rear wheel 20R is found to be equal to or larger than the second target slip value STB as a comparison of the former with the latter, the traction control is performed by controlling the electromagnetically opening or closing valves 53 and 54 to thereby operate the disk brake 35D and consequently controlling the corresponding brake by reducing the torque for driving the right-hand rear wheel 20R.

It is to be noted herein that the secondary throttle valve 17 is so arranged as to maintain its largest possible opening angle, i.e. to assume its full open state, when no traction control is performed by adjusting the opening angle of the secondary throttle valve.

In performing the traction control by adjusting the opening angle of the secondary throttle valve 17 by the control unit 100, the traction control is started at the time when the slip value SP has turned to a value equal to or larger than the first target slip value STT from the state in which the slip value SP is smaller than the first target slip value STT, i.e. from the state in which no traction control is carried out so that the secondary throttle valve 17 is fully opened. Upon the start of the traction control, first, a drive signal Ct is supplied from the control unit 100 to the throttle actuator 16 for driving the secondary throttle valve 17 to assume its initial opening angle. It is to be noted herein that the initial opening angle of the secondary throttle valve 17 is set, for example, to 50% when the opening angle of the main throttle valve 15, indicated by the output signal St, is as small as less than 50%, while an opening angle corresponding to the opening angle of the main throttle valve 15 when the opening angle of the main throttle valve 15 is equal to or larger than 50%, indicated by the output signal St. Thereafter, a drive signal Ct for adjusting the opening angle of the secondary throttle valve 17 is supplied to the throttle actuator 16 from the control unit 100 in order to bring the slip value SP into agreement with the first target slip value STT.

The traction control by controlling the brakes by means of the control unit 100 is performed, in addition to the traction control by adjusting the opening angle of the secondary throttle valve, when the slip value SPL for the left-hand rear wheel 20L or the slip value SPR for the right-hand rear wheel 20R is equal to or larger than the second target slip value STB. More specifically, when the slip value SPL detected at the time when the left-hand rear wheel 20L slips on the road surface is equal to or larger than the second target slip value STB, drive signals Ca and Cb are supplied from the control unit 100 to the electromagnetically opening or closing valves 51 and 52 and the disk brake 35C is so operated as to bring the peripheral speed of the left-hand rear wheel 20L into agreement with a target peripheral speed NTD corresponding to the second target slip value STB. On the other hand, when the slip value SPR detected at the time when the right-hand rear wheel 20R slips on the road surface is equal to or larger than the second target slip value STB, drive signals Cc and Cd are supplied from the control unit 100 to the electromagnetically opening or closing valves 53 and 54 and the disk brake 35D is so operated as to bring the peripheral speed of the right-hand rear wheel 20R into agreement with a target peripheral speed NTD corresponding to the second target slip value STB.

With the arrangement as described hereinabove, a control amount XCL for decreasing, increasing or retaining the braking liquid pressure to the disk brake 35C is set for the electromagnetically opening or closing valves 51 and 52 when the drive signals Ca and Cb are supplied to the valves 51 and 52, respectively, from the control unit 100 in performing the traction control by controlling the brakes by means of the control unit 100. Likewise, a control amount XCR for decreasing, increasing or retaining the braking liquid pressure to the disk brake 35D is set for the electromagnetically opening or closing valves 53 and 54 when the drive signals Cc and Cd are supplied to the valves 53 and 54, respectively, from the control unit 100 in performing the traction control by controlling the brakes by means of the control unit 100. In these cases, the drive signals Ca and Cb are formed so as to comply with the control amount XCL while the drive signals Cc and Cd are formed so as to comply with the control amount XCR.

Description will now be made of the manner in which the control amount XCL is set for the valves 51 and 52 and the control amount XCR is set for the valves 53 and 54.

In setting the control amount XCL for the valves 51 and 52, there is given peripheral acceleration ACL of the left-hand rear wheel 20L on the basis of the peripheral speed of the left-hand rear wheel 20L indicated by the output signal S3. Further, there is given a deviation DNL from a target peripheral speed NTD of the peripheral speed of the left-hand rear wheel 20L indicated by the output signal S3. Then, there is given a basic control amount XCLB corresponding to the given peripheral acceleration ACL and the deviation DNL by collating the peripheral acceleration ACL and the deviation DNL with a data map, prestored in a memory built in the control unit 100, the relationship among the peripheral acceleration ACL, the deviation DNL and the basic control amount XCLB. Table below shows an example of data map to be employed for giving the basic control amount XCLB.

TABLE

| DNL (Km/h) | ACL (G) −3.0 | −2.0 / −1.0 | −0.5 / −0.25 | 0.25 / 0.5 | 1.0 / 2.0 | 3.0 |
|---|---|---|---|---|---|---|
| −10— | PL2 | PL1 PL1 | PM2 PM2 | PM2 PM2 | PM2 PM2 | PS2 PS2 Z0 |
| −5— | PL1 | PM2 PM2 | PM1 PM1 | PM1 PM1 | PM1 PS1 | PS1 Z0 |
| −2— | PM2 | PM1 PM1 | PM1 PM1 | PM1 PM1 | PM1 Z0 | Z0 Z0 |
| −1— | PM1 | PM1 PM1 | PS2 PS2 | PS2 PS2 | PS2 Z0 | Z0 Z0 |
| −0.5— | PS2 | PS2 PS2 | PS1 PS1 | PS1 PS1 | PS1 Z0 | Z0 Z0 |
| 0.5— | PS1 | PS1 PS1 | PS1 PS1 | PS1 PS1 | Z0 Z0 | Z0 Z0 |
| 1— | PS1 | PS1 PS1 | Z0 Z0 | Z0 Z0 | Z0 Z0 | Z0 NS1 |
| 2— | PS1 | Z0 Z0 | Z0 Z0 | Z0 Z0 | Z0 Z0 | NS1 NS2 |
| 5— | Z0 | Z0 Z0 | Z0 Z0 | Z0 NS1 | NS1 NS1 | NS2 NM2 |
| 10— | Z0 | Z0 NS1 | NS1 NS1 | NS1 NS2 | NS2 NM1 | NM1 NL1 |
|  | NS1 | NS1 NS1 | NS2 NS2 | NS2 NS2 | NS2 NM2 | NM2 NL2 |

Notes:
PL2, PL1, PM2, PM1, PS2 and PS1 indicate basic control amounts for reducing the pressure in six stages in the order from PS1 (lower) to PL2 (higher). On the contrary, NL2, NL1, NM2, NM1, NS2 AND NS1 indicate basic control amounts for increasing the pressure in six stages in the order from NS1 (lower) to NL2 (higher).
Z0 is a basic control amount for maintaining the current state. The contents of the Table above is stored in the ROM of the control unit 100.

Likewise, the setting of the control amount XCR is made, first, by giving peripheral acceleration ACR for the right-hand rear wheel 20R on the basis of the peripheral speed of the right-hand rear wheel 20R indicated by the output signal S4 and then by giving a deviation DNR from a target peripheral speed NTD of the peripheral speed of the right-hand rear wheel 20R indicated by the output signal S4. Thereafter, a basic control amount XCRB corresponding to the given peripheral acceleration ACR and the deviation DNR is given by collating the given peripheral acceleration ACR and the deviation DNR with a data map, pre-stored in the memory built in the control unit 100, indicating the relationship among the peripheral acceleration ACR, the deviation DNR and the basic control amount XCRB. In this case, an example of data maps for giving the basic control amount XCRB is the same as in Table shown hereinabove, except for replacement of the peripheral acceleration ACL and the deviation DNL by the peripheral acceleration ACR and the deviation DNR, respectively.

The control unit 100 is so designed as to determine if the automotive vehicle is currently travelling on a bad road on the basis of changes in the peripheral acceleration ACL of the left-hand rear wheel 20L and in the peripheral acceleration ACR of the right-hand rear wheel 20R within a unit time and, furthermore, to determine if the automotive vehicle is currently cornering on the basis of the steered angles of the left-hand front wheel 21L and the right-hand front wheel 21R indicated by the output signal Sd. When it is determined that the automotive vehicle is neither travelling on a bad road nor cornering, the basic control amount XCLB is set as a control amount XCL on the basis of which the drive signals Ca and Cb are formed, while the basic control amount XCRB is set as a control amount XCR on the basis of which the drive signals Cc and Cd are formed.

On the other hand, when it is determined that the automotive vehicle is travelling on a bad road, the control unit 100 changes the basic control amounts XCLB and XCRB obtained on the basis of the data map as indicated by the Table above and the data map as corresponding to the Table above, respectively, on the pressure-decreasing side. More specifically, for instance, if the basic control amount is NL2, then it is changed to NM1; if it is NM2, then it is changed to NS1; or if it is NS1, then it is changed to Z0. In summary, the basic control amounts are changed toward the pressure-decreasing side by two or three stages. It is to be noted herein that the limit of correction of the basic control amounts toward the pressure-decreasing side is up to Z0. The basic control amount XCLB which has been corrected toward the pressure-decreasing side in the manner as described hereinabove is set as a control amount XCL on the basis of which the drive signals Ca and Cb are formed, while the basic control amount XCRB which has been corrected toward the pressure-decreasing side in the manner as described hereinabove is set as a control amount XCR on the basis of which the drive signals Cc and Cd are formed. Further, when it is determined that the automotive vehicle is cornering, the control unit 100 changes the basic control amounts XCLB and XCRB toward the pressure-increasing side by one or two stages, for example, from NS1 to NM1, from NM1 to NL1, or from NL1 to NL2. It is to be noted herein that the limit of correction of the basic control amounts toward the pressure-increasing side is up to NL2. The basic control amount XCLB which has been corrected toward the pressure-increasing side in the manner as described hereinabove is set as a control amount XCL on the basis of which the drive signals Ca and Cb are formed, while the basic control amount XCRB which has been corrected toward the pressure-increasing side in the manner as described hereinabove is set as a control amount XCR on the basis of which the drive signals Cc and Cd are formed.

Hence, when the automotive vehicle is not travelling on a bad road or cornering, the traction control by controlling the brakes by means of the control unit 100 is performed by setting the basic control amounts XCLB and XCRB obtained on the basis of the data maps as indicated by the Table above and by the corresponding table as the control amounts XCL and XCR as they are, and by supplying the drive signals Ca and Cb formed by the control amount XCL and the drive signals Cc and Cd formed by the control amount XCR to the electromagnetically opening or closing valves 51, 52 and 53, 54, respectively. When it is determined that the automotive vehicle is travelling on a bad road, on the one hand, the traction control by controlling the brakes is performed by changing the basic control amounts XCLB and XCRB toward the pressure-decreasing side to thereby loosen the operation of the disk brakes 35C and 35D, setting them as the control amounts XCL and XCR, forming the drive signals Ca, Cb and Cc, Cd on the basis of the control amounts XCL and XCR, and supplying the drive signals Ca, Cb and Cc, Cd to the electromagnetically opening or closing valves 51, 52 and 53, 54, respectively. When it is determined that the automotive vehicle is cornering, on the other hand, the traction control by controlling the brakes is performed by changing the basic control amounts XCLB and XCRB toward the pressure-increasing side to thereby tighten the operation of the disk brakes 35C and 35D, setting them as the control amounts XCL and XCR, forming the drive signals Ca, Cb and Cc, Cd on the basis of the control amounts XCL and XCR, and supplying the drive signals Ca, Cb and Cc, Cd to the electromagnetically opening or closing valves 51, 52 and 53, 54, respectively.

It should be noted herein that, when the automotive vehicle is travelling on a bad road and it is cornering, the traction control is first performed by controlling the brakes in the state of the automotive vehicle travelling on a bad road in the manner as described hereinabove.

In performing the traction control by controlling the brakes in such a state that the automotive vehicle is travelling on a bad road, the operation of the disk brakes 35C and 35D to the respective left-hand rear wheel 20L and right-hand rear wheel 20R is loosened, thereby preventing the disk brakes 35C and 35D from operating against the left-hand rear wheel 20L and the right-hand rear wheel 20R, respectively, too tightly. This can prevent the automotive vehicle from taking undesirable behavior and action. On the other hand, in performing the traction control by controlling the brakes in the state in which the automotive vehicle is cornering, the operation of the disk brakes 35C and 35D against the respective left-hand rear wheel 20L and right-hand rear wheel 20R is tightened, thereby converging the peripheral speeds of the left-hand rear wheel 20L and the right-hand rear wheel 20R toward the target peripheral speed NTD rapidly and preventing the automotive vehicle from taking undesirable behavior and action.

The detection by the control unit 100 as to whether the automotive vehicle is travelling on bad road is made by detecting, for instance, frequency of changes in the peripheral acceleration ACL of the left-hand rear wheel 20L and in the peripheral acceleration ACR of the right-hand rear wheel 20R, which exceed a predetermined positive or negative value, within a predetermined unit time and determining if the frequency of such changes exceeds the predetermined number of times within the predetermined unit time. On the other hand, whether the automotive vehicle is cornering is determined by the control unit 100 when the steered angles of the left-hand front wheel 21L and the right-hand front wheel 21R indicated by the output signal Sd is 30 degrees or larger.

Description will now be made of an example of programs to be executed by the control unit 100 composed of the microcomputer in performing the traction control, with reference to the flow charts as shown in FIGS. 2(A)-2(D) and 3(A)-3(B).

Description will be made of the control example of the traction control system according to the present invention with respect to the accompanying drawings.

First, at step P1, the signals are inputted from each of the sensors, followed by proceeding to step P2 at which the road surface friction coefficient $\mu$ is assumed on the basis of the vehicle speed and the acceleration of the vehicle body obtainable by differentiating the vehicle speed.

Then, at step P3, each basic target value, i.e. target slip value, for controlling the engine and the brake is determined in accordance with the assumed road surface friction coefficient $\mu$. It is to be noted herein that the target value for controlling the brake is set larger than the target value for controlling the engine although each of the basic target values becomes larger as the road surface friction coefficient $\mu$ gets larger. At step P4, each of the basic target values determined at step P3 is corrected on the basis of the vehicle speed, the accelerator opening angle, and the steered angle of a steering wheel to give the respectively final target values, i.e. target value STT for controlling the engine and target value STB for controlling the brake. It is noted herein that the target value STT is set smaller than the target slip value STB.

Then, the program flow goes to step P5 at which an average VWN between the peripheral speeds of the left-hand front wheel (undriven wheel) 21L and the right-hand front wheel (undriven wheel) 21R is given, followed by proceeding to step P6 at which a target peripheral speed (target rotational speed) NTD for the right-hand rear wheel (driven wheel) 20R and the left-hand rear wheel (driven wheel) 20L is determined so as to correspond with the target value STB. In this case, the average peripheral speed VWN is employed for computing the target peripheral speed NTD.

At step P7, a decision is made to determine if the left-hand peripheral speed VWDL of the left-hand driven wheel 20L is equal to or larger than the right-hand peripheral speed VWDR of the right-hand driven wheel 20R. When the result of decision at step P7 indicates that the left-hand peripheral speed VWDL is equal to or larger than the right-hand peripheral speed VWDR, then the program flow goes to step P9 at which the left-hand peripheral speed VWDL is set as a peripheral speed VWD for the driven wheels to be used for controlling the engine. On the contrary, when it is decided at step P7 that the left-hand peripheral speed VWDL is smaller than the right-hand peripheral speed VWDR, then the program flow proceeds to step P8 at which the right-hand peripheral speed VWDR is set as the peripheral speed VWD for the driven wheels to be used for controlling the engine.

Then, the program flow goes to step P10 at which three slip values SP, SPL and SPR, indicative of actual slip values of the driven wheels, are determined. The slip value SP indicates a slip value for controlling the engine, which is determined as a deviation between the peripheral speed VWD for the driven wheel and the average peripheral speed VWN between the undriven wheels. The slip value SPL is a slip value for controlling the brake for the left-hand driven wheel 20L, while the slip value SPR is a slip value for controlling the brake for the right-hand driven wheel 20R. The slip value SPL is determined as a deviation between the peripheral speed VWDL of the left-hand driven wheel 20L and the average peripheral speed VWN of the undriven wheels. Likewise, the slip value SPR is determined as a deviation between the peripheral speed VWDR of the right-hand driven wheel 20R and the average peripheral speed VWN of the undriven wheels.

Figure 2B:
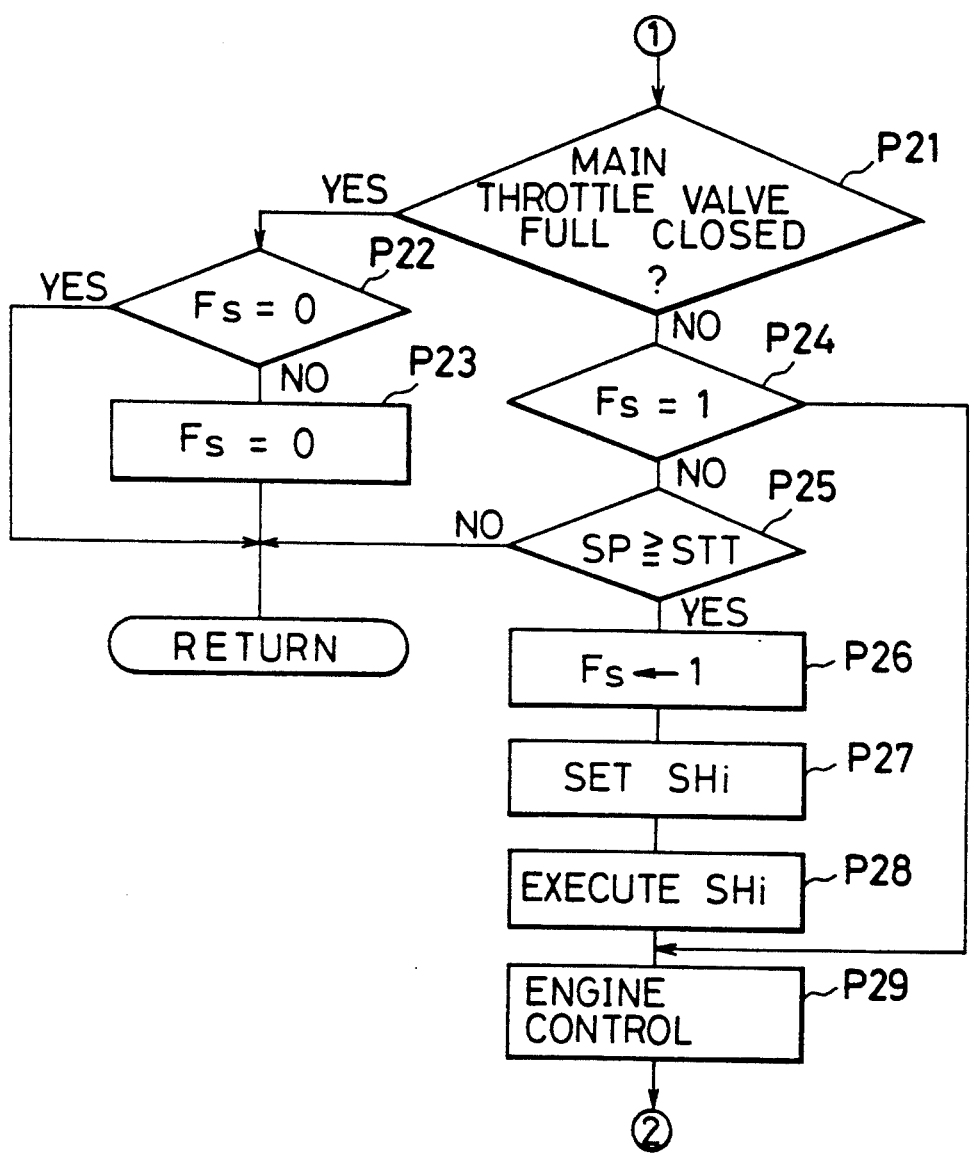

After the step P10, the program flow advances to step P21 of FIG. 2(B) at which a decision is made to determine if the main throttle valve 15 is fully closed. When the result of decision at step P21 indicates that the main throttle valve 15 is fully closed, the conditions for suspending the slip (traction) control are satisfied so that the program flow goes to step P22 at which another decision is made to determine if a slip flag Fs is set to one. The slip flag Fs=1 means that the slip control is in progress. Therefore, when it is decided at step P22 that the slip flag Fs is set to one, the program flow is returned to step P1 as it is. On the contrary, when it is decided at step P22 that the slip flag Fs is not set to one, then the program flow goes to step P23 at which the slip flag Fs is reset to zero, followed by the return to step P1.

On the other hand, when the result of decision at step P21 indicates that the main throttle valve 15 is not fully closed, then the program flow goes to step P24 at which a decision is made to determine if the slip control is currently in progress. If it is decided at step P24 that the slip control is not currently in progress, on the one hand, then the program flow advances to step P25 at which a decision is made to determine if the slip value SP for controlling the engine is equal to or larger than the target slip value STT. When the result of decision of step P25 indicates that the slip value SP is smaller than the target slip value STT, then the program flow is returned to step P1 as it is because no slip control is required at this time.

When it is decided at step P25 that the slip value SP is equal to or larger than the target slip value STT, then the program flow goes to step P26 at which the slip flag Fs is set to one, followed by proceeding to step P27 at which an initial value SHi for the secondary throttle valve 17 is set. The initial value SHi for the secondary throttle valve 17 is set to 50% when an opening angle of the main throttle valve 15 is less than 50%, while it is set to an opening angle corresponding to the opening angle of the main throttle valve 15 when the opening angle of the main throttle valve 15 is equal to or larger than 50%. Thereafter, at step P29, the secondary throttle valve 17 is subjected to feedback control so as to allow the actual slip value SP for the driven wheels to agree with the target value STT.

Figure 2D:
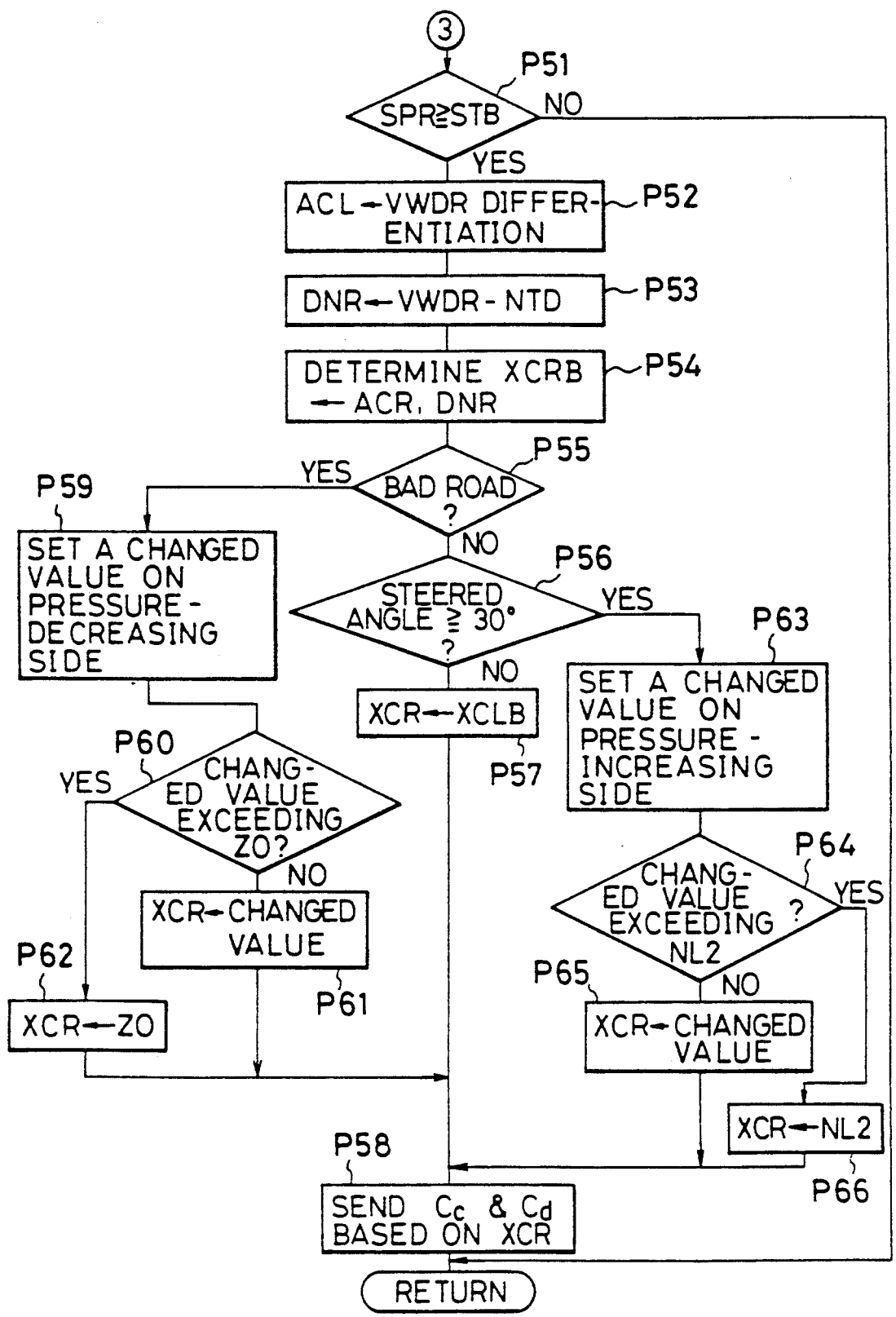

After step P29, the program flow goes to step P31 of FIG. 2(C). FIG. 2(C) shows the slip control for the left-hand driven wheel 20L while FIG. 2(D) shows the slip control for the right-hand driven wheel 20R. The slip control for the right-hand driven wheel 20R is performed in substantially the same manner as the slip control for the left-hand driven wheel 20L, so that duplicate description of FIG. 2(D) will be omitted from description of FIG. 2(C).

In FIG. 2(C), first at step P31, a decision is made to determine if the actual slip value SP of the left-hand driven wheel 20L is equal to or larger than the target slip value STB. When it is decided at step P31 that the actual slip value SP is smaller than the target value STB, then the program flow is transferred to step P51 of FIG. 2(D) because no slip control is required for the left-hand driven wheel 20L.

On the other hand, when the result of decision at step P31 indicates that the actual slip value SP is equal to or larger than the target value STB, then the program flow goes to step P32 at which the left-hand peripheral acceleration ACL is computed by differentiating the peripheral speed VWDL of the left-hand driven wheel 20L. Then, at step P33, there is given a deviation DNL between the peripheral speed VWDL of the left-hand driven wheel 20L and the target peripheral speed NTD corresponding to the target slip value STB, followed by proceeding to step P34 at which the corresponding stored value, i.e. a first control amount XCLB, is selected from a data map pre-stored in the memory of the control unit 100 by collating the peripheral acceleration ACL and the deviation DNL with the Table above. In this case, the peripheral acceleration ACL means a portion for the differentiation control of the feedback control, while the deviation DNL means a portion for the proportional control of the feedback control.

Then, at step P35, a decision is made to determine if the automotive vehicle is currently travelling on bad road. The process for determining that the automotive vehicle is travelling on bad road will be described hereinafter. When it is decided at step P35 that the automotive vehicle is not travelling on bad road, then the program flow goes to step P36 at which another decision is made to determine if the automotive vehicle is currently cornering by checking whether the current steered angle of the steering wheel is equal to or larger than 30 degrees. If the result of decision at step P36 indicates that the automotive vehicle is not cornering, then the program flow goes to step P37 at which the first control amount XCLB is set as a final control amount XCL as it is, followed by proceeding to step P38 at which the output signals Ca and Cb corresponding to the final control amount XCL are transmitted to the electromagnetically opening or closing valves 51 or 52.

On the other hand, when the result of decision at step P35 indicates that the automotive vehicle is currently travelling on bad road, then the program flow goes to step P39 at which a value (changed value), i.e. a second control amount, is selected from the stored values as shown in the Table above, a changed value existing on the pressure-decreasing side (i.e. on the side of loosening the operation of the braking force) by two or three stages with respect to the first control amount XCLB. Then, at step P40, a decision is made to determine if the changed value exceeds Z0 that means retaining the braking force. When it is decided at step P40 that the changed value does not exceed Z0, on the one hand, then the program flow goes to step P41 at which the changed value is set as the control amount XCL (in this case, the control amount XCL means a second control amount) as it is. When the result of decision at step P40 indicates that the changed value exceeds Z0, on the other hand, then the program flow goes to step P42 at which the value Z0 is set as the control amount XCL. After step P41 and step P42, the program flow proceeds to step P38 at which the output signals Ca and Cb are formed on the basis of the control amount XCL and transmitted to the valve 51 or 52.

When the result of decision at step P36 indicates that the automotive vehicle is currently cornering, the processing is performed at steps P43 to P46. As the processing at steps P43 to P46 is substantially the same as the processing at steps P39 to P42, except for the selection of the control amount XCLB on the pressure-increasing side, i.e. on the side of tightening the braking force to the disk brakes 35C and 35D, further description will be omitted.

Figure 3A:
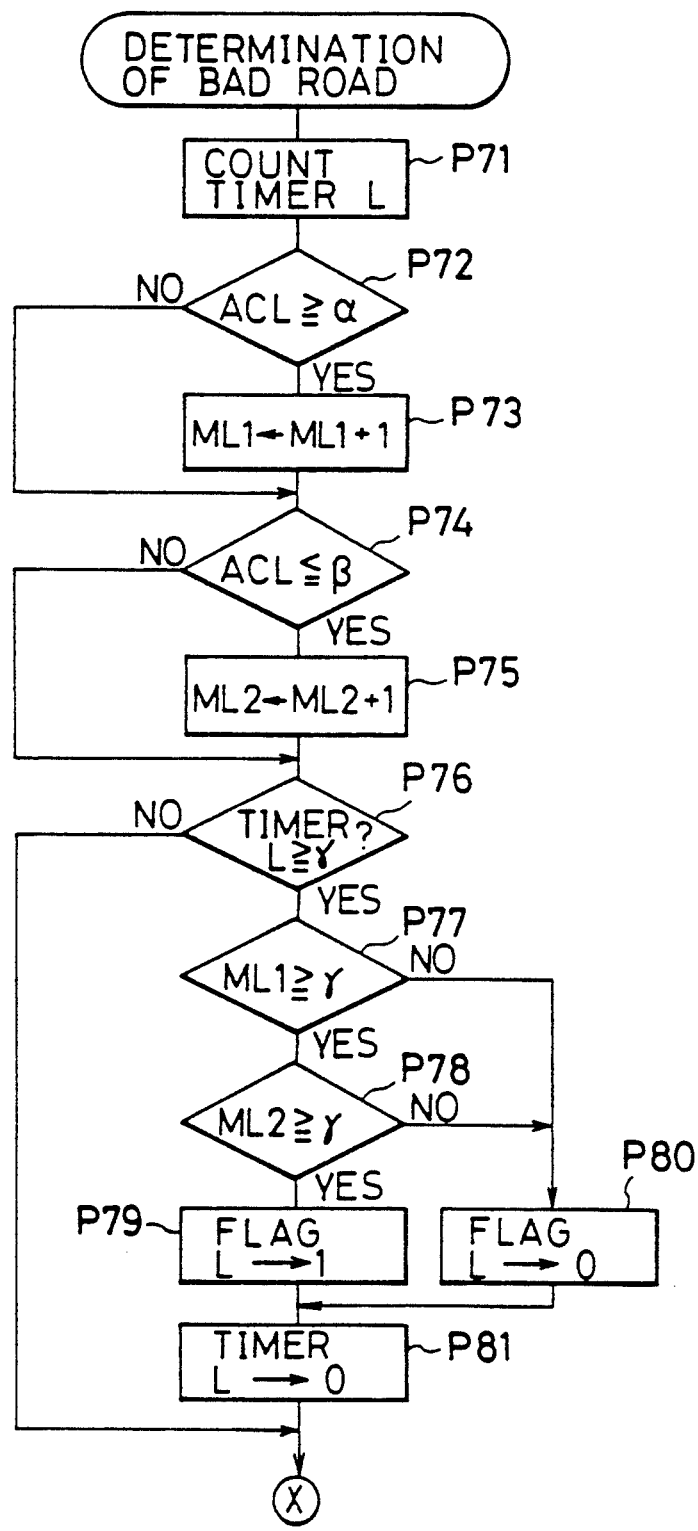
FIGS. 3A and 3B are a series of flow charts showing an example of control to be performed by the traction control system according to the present invention.
Figure 3B:
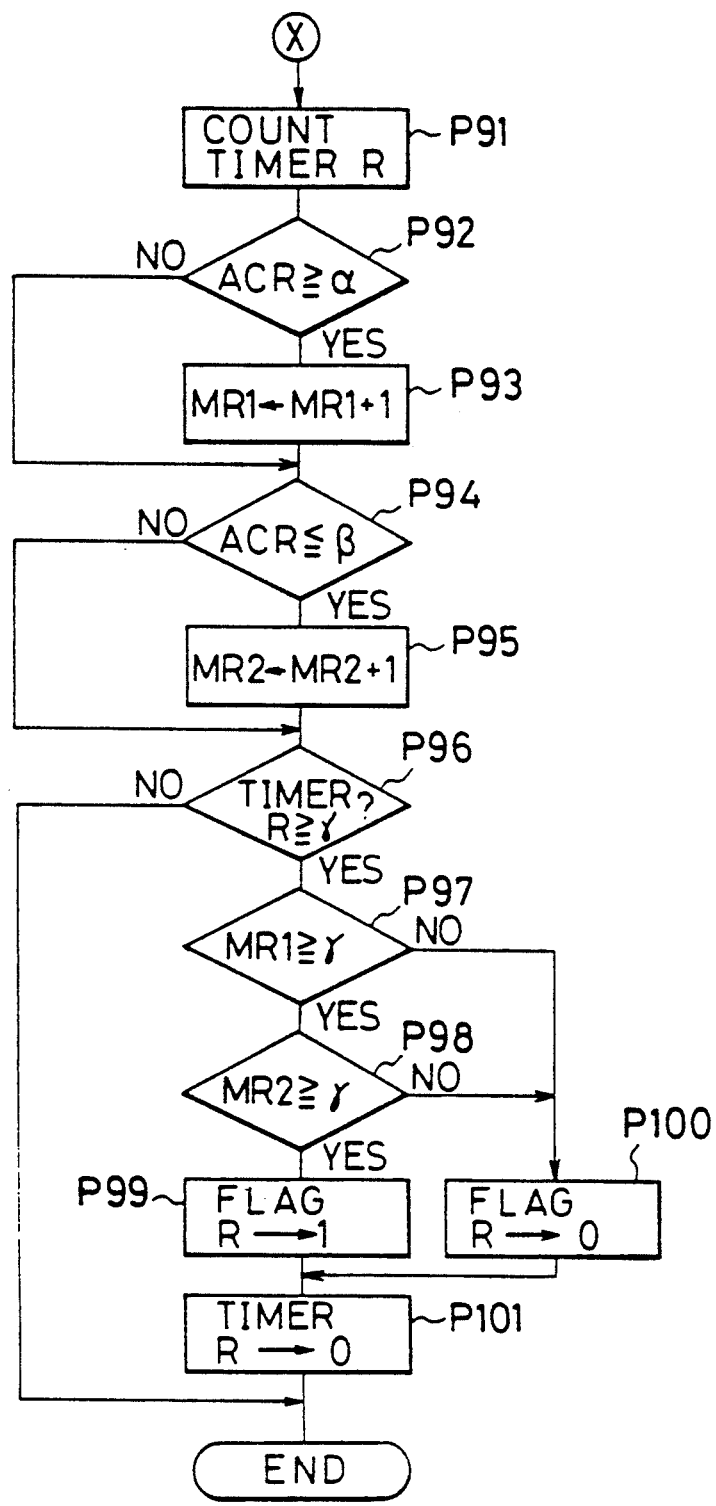

FIGS. 3(A) and 3(B) show a control example for determining if the automotive vehicle is currently travelling on bad road. FIG. 3(A) shows a control example for determining if the left-hand driven wheel 20L is travelling on bad road while FIG. 3(B) shows a control example for determining the right-hand driven wheel 20R travelling on bad road, and the control contents in both cases are substantially the same as each other. Hence, description will be made of the control example as shown in FIG. 3(A) only. It is also to be noted that the processing in FIGS. 3(A) and 3(B) is performed by interrupt processing into the processing in FIGS. 2(A) to 2(D) at every predetermined time.

First, at step P71, a timer L is counted up, followed by proceeding to step P72 at which a decision is made to determine if the peripheral acceleration ACL for the left-hand driven wheel 20L is equal to or larger than a predetermined positive threshold value $\alpha$. When the result of decision at step P71 indicates that the peripheral acceleration ACL is equal to or larger than the predetermined positive threshold value $\alpha$, then the program flow goes to step P73 at which a count value ML1 indicating the count in which the peripheral acceleration ACL exceeds the positive threshold value $\alpha$ is counted up by one, followed by proceeding to step P74. On the other hand, when it is decided at step P72 that the peripheral acceleration ACL is smaller than the positive threshold value $\alpha$, then the program flow proceeds to step P74 without passage through step P73.

At step P74, a decision is made to determine if the peripheral acceleration ACL for the left-hand driven wheel 20L is equal to or smaller than a predetermined negative threshold value $\beta$. When the result of decision at step P74 indicates that the peripheral acceleration ACL is equal to or smaller than the negative threshold value $\beta$, on the one hand, then the program flow goes to step P76 at which a count value ML2 indicative of the count in which the peripheral acceleration ACL exceeds the negative threshold value $\beta$ is counted up by one, followed by proceeding to step P76. When it is decided at step P74 that the peripheral acceleration ACL is larger than the negative threshold value $\beta$, on the other, then the program flow advances to step P76 without passage through step P75.

Then, at step P76, a decision is made to determine if the count value of the timer L is equal to or larger than a predetermined value $\gamma$. When the result of decision at step P76 indicates that the count value of the timer L is equal to or larger than the predetermined value $\gamma$, on the one hand, then the program flow goes to step P77 at which a decision is made to determine if the count value ML1 is equal to or larger than a predetermined count of times. If it is decided at step P77 that the count value ML1 is equal to or larger than the predetermined count of times, then the program flow proceeds to step P78 at which a decision is made to determine if the count value ML2 is equal to or larger than the predetermined count of times.

When the result of decision at step P78 indicates that the count value ML2 is equal to or larger than the predetermined count of times, then the program flow goes to step P79 at which a flag L for determining if the automotive vehicle is travelling on bad road is set to one. When a negative decision is made in either one of the decision at step P77 or at step P78, then the program flow advances to step P80 at which the flag L is reset to zero. It is to be noted as a matter of course that the state of the flag L at step P79 or step P80 is employed for determination at step P35 in FIG. 2(C) and at step P55 in FIG. 2(D).

After step P79 or step P80, the program flow goes to step P81 at which the timer L is reset to zero.

When the result of decision at step P79 indicates that the flag L is not set to one, the program ends as it is because no conditions are satisfied for determining if the automotive vehicle is travelling on bad road.

It is to be understood that the present invention is not restricted to those embodiments as described hereinabove and it encompasses the following modifications, changes and variations as illustrative examples within the scope and spirit of the present invention.

The slip control may be performed by controlling the brakes alone.

The slip value of the driven wheel may be represented, for example, by a ratio of the peripheral speed of the driven wheel to the peripheral speed of the undriven wheel or a ratio of the peripheral speed of the driven wheel minus the peripheral speed of the undriven wheel to the peripheral speed of the undriven wheel, in addition to the difference the vehicle speed (the peripheral speed of the undriven wheel) and the peripheral speed of the driven wheel.

The second control amount corresponding to the particular travelling state may be formed in a table containing the second control amounts separately and independently from the Table above storing the first control amounts.

Each of the control amounts, particularly the first control amount, may be computed in each control cycle on the basis of the predetermined operating formula for the feedback control without using any stored value as indicated in the Table above. In this case, the first control amount and the second control amount can be determined by changing a control gain of the operating formula in accordance with the travelling state of the automotive vehicle.

Further, appropriate procedures such as detecting acceleration acting in the vertical direction upon the vehicle body, detecting a speed at which the vehicle height changes, etc. may be adopted for detecting whether the automotive vehicle is travelling on a bad road.

It is to be understood that the foregoing text and drawings relate to embodiments of the present invention given by way of examples but not limitation. Various other embodiments and variants are possible within the spirit and scope of the present invention.

What is claimed is:

1. A traction control system for an automotive vehicle, comprising:
   slip detecting means for detecting a slip value of a driven wheel on a road surface;
   braking force adjusting means for adjusting braking force to the driven wheel;
   particular travelling state detecting means for detecting a particular travelling state in which a travelling state of the automotive vehicle is different from a basic travelling state;
   peripheral speed detecting means for detecting a peripheral speed of the driven wheel;
   differentiation means for differentiating the peripheral speed of the driven wheel to obtain a differentiated value of the peripheral speed thereof;
   first control amount determining means for determining a first control amount for said braking force adjusting means based on the differentiated value of the peripheral speed thereof so that said first control amount is set greater as the differentiated value becomes greater in accordance with the basic travelling state in order to bring the slip value detected by said slip detecting means into agreement with a first predetermined target value for controlling a brake;
   second control amount determining means for determining a second control amount for said braking force adjusting means based on the differentiated value of the peripheral speed of the driven wheel so that the second control amount is set greater as the differentiated value becomes greater in accordance with the particular travelling state in order to bring the slip value detected by said slip detecting means into agreement with a second predetermined target value for controlling the brake said second control amount is set so as to become lower than said first control amount for the same amount of the peripheral value of the peripheral speed of the driven wheel; and
   brake control means for controlling said braking force adjusting means by the first control amount in the basic travelling state and by the second control amount when the particular travelling state is detected by said particular travelling state detecting means so that more braking force is applied as the first and second control amounts become larger.

2. A traction control system as claimed in claim 1, wherein:
   the basic travelling state is a state in which the automotive vehicle is travelling on a flat road; and
   the particular travelling state is a state in which the automotive vehicle is travelling on a bad road.

3. A traction control system as claimed in claim 2, wherein the bad road is a rough road.

4. A traction control system as claimed in claim 3, further comprising means for detecting the bad road, wherein said means comprises:
   peripheral acceleration detecting means for detecting peripheral acceleration of the driven wheel;
   first counting means for counting times when the peripheral acceleration detected by the peripheral acceleration detecting means exceeds a first threshold value as a positive value within a predetermined unit time;
   second counting means for counting times when the peripheral acceleration detected by the peripheral acceleration detecting means exceeds a second threshold value as a negative value within a predetermined unit time; and determination means for determining if the automotive vehicle is travelling on the bad road on the basis of a count counted by the first counting means and a count counted by the second counting means.

5. A traction control system as claimed in claim 1, wherein:
the basic travelling state is a state in which the automotive vehicle is travelling straight forwards; and
the particular travelling state is a state in which the automotive vehicle is cornering.

6. A traction control system as claimed in claim 5, wherein the state in which the automotive vehicle is cornering is determined to exist when a steered angle of a steering wheel is equal to or larger than a predetermined steered angle.

7. A traction control system as claimed in claim 1, wherein the second control amount determining means is to determine the second control amount by correcting the first control amount.

8. A traction control system as claimed in claim 7, wherein the second control amount is determined by the second control amount determining means only when the particular travelling state is detected by the particular travelling state detecting means.

9. A traction control system as claimed in claim 7, further comprising storage means in which the first control amount corresponding to the differentiated value obtained by differentiating is stored;
wherein the first control amount is determined by selecting a stored value corresponding to the differentiated value from stored values stored in the storage means.

10. A traction control system as claimed in claim 1, further comprising peripheral acceleration detecting means for detecting peripheral acceleration of the driven wheel;
wherein the first control amount and the second control amount are determined by using the peripheral acceleration detected by the peripheral acceleration detecting means as a parameter.

11. A traction control system as claimed in claim 10, wherein the peripheral acceleration detecting means comprises:
said peripheral speed detecting means for detecting a peripheral speed of the driven wheel; and
differentiating means for computing peripheral acceleration by differentiating the peripheral speed detected by the peripheral speed detecting means.

12. A traction control system as claimed in claim 10, wherein:
the first control amount and the second control amount are determined by additionally using a difference between a target peripheral speed of the driven wheel corresponding to the target value for controlling the brake and said peripheral speed of the driven wheel detected by said peripheral speed detecting means as a parameter.

13. A traction control system as claimed in claim 12, wherein the second control amount is determined by correcting the first control amount.

14. A traction control system as claimed in claim 13, further comprising:
storage means for storing the first control amount by using the peripheral acceleration and the difference as parameters;
wherein the first control amount is determined by selecting a stored value corresponding to the peripheral acceleration and the difference from stored values stored by the storage means.

15. A traction control system as claimed in claim 1, wherein:
said peripheral speed detecting means comprising a first means for detecting said peripheral speed of the driven wheel and second means for detecting a peripheral speed of the undriven wheel; and
the slip detecting means computes the slip value on the basis of the peripheral speed of the driven wheel detected by the first means and the peripheral speed of the undriven wheel detected by the second means.

16. A traction control system as claimed in claim 15, wherein the slip value is indicated as a value indicative of a difference between the peripheral speed of the driven wheel and the peripheral speed of the undriven wheel.

17. A traction control system as claimed in claim 1, further comprising:
torque adjusting means for adjusting torque to be generated by a combustion engine; and
engine controlling means for controlling the torque to be generated by the combustion engine so as to bring the slip value detected by the slip detecting means into agreement with a third predetermined target value for controlling the engine.

18. A traction control system as claimed in claim 17, wherein the third predetermined target value for controlling the engine is smaller than at least one of the first and second predetermined target values for controlling the brake.

19. A traction control system as claimed in claim 7, further comprising limit means for restricting the second control amount from exceeding a predetermined limit value.

20. A traction control system as claimed in claim 19, wherein the limit value is set as a control amount corresponding to retaining of current braking force.

21. A traction control system as claimed in claim 9, wherein:
the basic travelling state is a state in which the automotive vehicle is travelling on a flat road;
the particular travelling state is a state in which the automotive vehicle is travelling on a bad road; and
correction by said brake control means is made by selecting a stored value so set as to allow the first control amount to reduce the braking force by a predetermined amount from stored value stored in the storage means.

22. A traction control system as claimed in claim 9, wherein:
the basic travelling state is a state in which the automotive vehicle is travelling straight forwards;
the particular travelling state is a state in which the automotive vehicle is cornering; and
correction by said brake control means is made by selecting a stored value so set as to allow the first control amount to increase the braking force by a predetermined amount from stored values stored in the storage means.

23. A traction control system as claimed in claim 1, wherein said first predetermined target value and said second predetermined target value are equal.

24. A traction control system for an automotive vehicle, comprising:

slip detecting means for detecting a slip value of a driven wheel on road surface;

braking force adjusting means for adjusting braking force to the driven wheel;

particular travelling state detecting means for detecting a particular travelling state in which a travelling state of the automotive vehicle is different from a basic travelling state;

peripheral speed detecting means for detecting a peripheral speed of the driven wheel;

differentiation means for differentiating the peripheral speed of the driven wheel to obtain a differentiated value of the peripheral speed thereof;

first control amount determining means for determining a first control amount for said braking force adjusting means based on the differentiated value of the peripheral speed thereof so that said first control amount is set greater as the differentiated value becomes greater in accordance with the basic travelling state in order to bring the slip value detected by said slip detecting means into agreement with a first predetermined target value for controlling a brake;

second control amount determining means for determining a second control amount for said braking force adjusting means based on the differentiated value of the peripheral speed of the driven wheel so that the second control amount is set greater as the differentiated value becomes greater in accordance with the particular travelling state in order to bring the slip value detected by said slip detecting means into agreement with a second predetermined target value for controlling the brake, said second control amount is set so as to increase the braking force more than said first control amount; and brake control means for controlling said braking force adjusting means by the first control amount in an ordinary travelling state and by the second control amount when said particular travelling state is detected by said particular travelling state detecting means.

25. A traction control system for an automotive vehicle, comprising:

slip detecting means for detecting a slip value of a driven wheel on road surface;

braking force adjusting means for adjusting braking force to the driven wheel;

particular travelling state detecting means for detecting a particular travelling state in which a travelling state of the automotive vehicle is different from a basic travelling state;

peripheral speed detecting means for detecting a peripheral speed of the driven wheel;

differentiation means for differentiating the peripheral speed of the driven wheel to obtain a differentiated value of the peripheral speed thereof;

first control amount determining means for determining a first control amount for said braking force adjusting means based on the differentiated value of the peripheral speed thereof so that said first control amount is set greater as the differentiated value becomes greater in accordance with the basic travelling state in order to bring the slip value detected by said slip detecting means into agreement with a first predetermined target value for controlling a brake;

second control amount determining means for determining a second control amount for said braking force adjusting means based on the differentiated value of the peripheral speed of the driven wheel so that the second control amount is set greater as the differentiated value becomes greater in accordance with the particular travelling state in order to bring the slip value detected by said slip detecting means into agreement with a second predetermined target value for controlling the brake;

brake control means for controlling the braking force adjusting means by the first control amount in an ordinary travelling state and by the second control amount when the particular travelling state is detected by the particular travelling state detecting means; and the basic travelling state is a state in which the automotive vehicle is travelling on a flat road and straight forward;

the particular travelling state detecting means comprises first particular travelling state detecting means for detecting a state in which the automotive vehicle is travelling on a bad road and second particular travelling state detecting means for detecting a state in which the automotive vehicle is cornering; and the second control amount is set so as to reduce the braking force when the state in which the automotive vehicle is travelling on the bad road is detected by the first particular travelling state detecting means and so as to increase the braking force when the state in which the automotive vehicle is cornering is detected by the second particular travelling state detecting means.

26. A traction control system as claimed in claim 25, wherein the second control amount is determined by correcting the first control amount.

27. A traction control system as claimed in claim 26, wherein the first control amount is corrected only when the particular travelling state is detected by at least one of the first and second particular travelling state detecting means.

28. A traction control system as claimed in claim 27, wherein correction by said brake control means when the automotive vehicle is travelling on the bad road is made before correction when the automotive vehicle is cornering.

29. A traction control system for an automotive vehicle, comprising:

slip detecting means for detecting a slip value of a driven wheel on a road surface;

braking force adjusting means for adjusting braking force to the driven wheel;

particular travelling state detecting means for detecting a particular travelling state in which a travelling state of the automotive vehicle is different from a basic travelling state, said particular travelling state detecting means being capable of detecting when the automotive vehicle is travelling on a bad road and when the automotive vehicle is cornering;

peripheral speed detecting means for detecting a peripheral speed of the driven wheel;

differentiation means for differentiating the peripheral speed of the driven wheel to obtain a differentiated value of the peripheral speed thereof;

first control amount determining means for determining a first control amount for said braking force adjusting means based on the differentiated value of the peripheral speed thereof so that said first control amount is set greater as the differentiated value becomes greater in accordance with the basic travelling state in order to bring the slip value detected by the slip detecting means into agreement with a first predetermined target value for controlling a brake;

second control amount determining means for determining a second control amount for said braking force adjusting means based on the differentiated value of the peripheral speed of the driven wheel so that the second control amount is set greater as the differentiated value becomes greater in accordance with the particular travelling state in order to bring the slip value detected by the slip detecting means into agreement with a second predetermined target value for controlling the brake, said second control amount is set so as to reduce the braking force more than said first control amount; and brake control means for controlling the braking force adjusting means by the first control amount in the basic travelling state and by the second control amount when the particular travelling state is detected by the particular travelling state detecting means, and correction by said brake control means when the automotive vehicle is travelling on a bad road is made before correction when the automotive vehicle is cornering.

* * * * *